United States Patent [19]

Record et al.

[11] Patent Number: 5,916,606
[45] Date of Patent: *Jun. 29, 1999

[54] CHEWING GUM COMPOSITIONS CONTAINING ERYTHRITOL AND A MOISTURE BINDING AGENT

[75] Inventors: David W. Record, River Forest; Gordon N. McGrew, Evanston; Robert J. Yatka, Orland Park, all of Ill.

[73] Assignee: Wm. Wrigley Jr. Company, Chicago, Ill.

[*] Notice: This patent is subject to a terminal disclaimer.

[21] Appl. No.: 08/619,574

[22] PCT Filed: Sep. 30, 1994

[86] PCT No.: PCT/US94/11005

§ 371 Date: Mar. 21, 1996

§ 102(e) Date: Mar. 21, 1996

[87] PCT Pub. No.: WO95/08928

PCT Pub. Date: Apr. 6, 1995

[30] Foreign Application Priority Data

Sep. 30, 1993 [WO] WIPO ............... PCT/US93/09354

[51] Int. Cl.⁶ ........................................ A23G 3/30
[52] U.S. Cl. ............................................... 426/3
[58] Field of Search ............................. 426/3, 4, 5, 6

[56] References Cited

U.S. PATENT DOCUMENTS

| 3,899,593 | 8/1975 | Hammond et al. | 426/3 |
| 4,000,320 | 12/1976 | Klose et al. | 426/3 |
| 4,065,578 | 12/1977 | Reggio et al. | 426/3 |
| 4,382,963 | 5/1983 | Klose et al. | 426/3 |
| 4,902,525 | 2/1990 | Kondou | 426/548 |
| 4,931,294 | 6/1990 | Yatka et al. | 426/3 |
| 4,933,188 | 6/1990 | Cherukuri et al. | 426/3 |
| 5,080,916 | 1/1992 | Kondou | 426/96 |
| 5,120,550 | 6/1992 | Van der Schueren | 426/3 |
| 5,156,866 | 10/1992 | Sato et al. | 426/5 |
| 5,397,579 | 3/1995 | Yatka et al. | 426/3 |
| 5,494,685 | 2/1996 | Tyrpin et al. | 426/5 |

FOREIGN PATENT DOCUMENTS

| 0 009 325 A | 4/1980 | European Pat. Off. |
| 0 325 790 A2 | 8/1989 | European Pat. Off. |
| 0 497 439 A1 | 8/1992 | European Pat. Off. |
| 0 511 761 A1 | 11/1992 | European Pat. Off. |
| 0 530 995 A1 | 3/1993 | European Pat. Off. |
| 56-18180 | 4/1981 | Japan. |
| 1-51045 | 2/1989 | Japan. |
| 1-225458 | 9/1989 | Japan. |
| 2-104259 | 4/1990 | Japan. |
| 4-287658 | 10/1992 | Japan. |
| 4-287659 | 10/1992 | Japan. |
| 5-137535 | 6/1993 | Japan. |
| WO 93/00828 | 1/1993 | WIPO. |
| 93/17578 | 9/1993 | WIPO | 426/3 |
| WO 95/08925 | 4/1995 | WIPO. |
| WO 95/08928 | 4/1995 | WIPO. |

OTHER PUBLICATIONS

Brochure entitled "Erythritol: new horizons in low–calory food ingredients", 4 pages, published by Cerestar, circa Feb. 1994.

*Confectionery Production*, "Erythritol: a new sweetner", pp. 182–184, 186–187, 193, Mar. 1994.

*Confectionery Production*, "New horizons in low–calorie bulk sweetners", pp. 637–638, Aug. 1993.

*Primary Examiner*—Arthur L. Corbin
*Attorney, Agent, or Firm*—Steven P. Shurtz; Brinks Hofer Gilson & Lione

[57] ABSTRACT

A chewing gum composition with increased stiffness comprising a gum base, erythritol, a moisture binding agent and flavor is disclosed.

13 Claims, No Drawings

CHEWING GUM COMPOSITIONS CONTAINING ERYTHRITOL AND A MOISTURE BINDING AGENT

BACKGROUND OF THE INVENTION

This invention relates to chewing gum. More particularly, it relates to chewing gum which contains erythritol and a moisture binder.

In recent years, efforts have been devoted to replace sugar and sugar syrups normally found in chewing gum with other carbohydrates and noncarbohydrates. Non-sugar or sugar-free chewing gum, which is growing in popularity, uses sugar alcohols or polyols to replace sugar and sugar syrups. The most popular polyols are sorbitol, mannitol and xylitol. New polyols are being developed using new technology to replace these polyols. New polyols have various unique properties which can improve the taste, texture and shelf life properties of chewing gum for consumers. The non-sugar polyols have the advantage of not contributing to dental caries of consumers, as well as being able to be consumed by diabetics.

Many polyols cause gastric distress when consumed in too great of quantities Therefore it would be desirable to use a non-cariogenic sweetener that did not cause gastric distress. Erythritol does not contribute to dental caries, does not significantly contribute to calories and does not cause gastric distress like some other polyols. Thus, this ingredient's use in chewing gum could be a definite improvement.

U.S. Pat. No. 5,120,550 discloses a chewing gum made with a sweetening agent containing erythritol and a liquid sugar alcohol.

EPO Patent Publication No. 0 009 325 and Japanese Patent Publication No. 81-18180 disclose a method of reducing dental caries with a sugarless chewing gum made with erythritol.

Low calorie sweetening compositions containing meso-erythritol are disclosed in U.S. Pat. Nos. 5,080,916 and No. 4,902,525, EPO Patent Publication No. 0 325 790, and Japanese Patent Publications No. 89-225458 and No. 90-104259.

Japanese Patent Publication No. 89-51045 discloses chewing gum made with a melted mixture of meso-erythritol and sugars or sugar alcohols.

EPO Patent Publication No. 0 497 439 discloses a sweetener employing the use of spray dried erythritol.

EPO Patent Publication No. 0 511 761 discloses a sweetening composition made up of erythritol, sorbitol and a glucose oligomer.

PCT Publication No. WO93/00828 discloses a stabilized dipeptide sweetening composition which is useful in chewing gum and may contain erythritol.

Other patents and publications which discuss erythritol include Japanese Patent Publications No. 92-287658 and No. 92-287659, both published Oct. 13, 1992, (sweetening compositions containing meso-erythritol); and European Patent Publication No. 0 530 995, published Mar. 10, 1993 (lozenge containing sweetener which is all or partly erythritol or maltitol).

It has been found, however, that using erythritol in chewing gum often causes the gum to be excessively soft, and therefore difficult to form, cut and package. This is especially true as the level of erythritol increases, and especially when the gum contains more than about 2% moisture. Even though erythritol has a low hygroscopicity, and therefore does not cause gum to gain moisture from the atmosphere, the original soft nature of the gum at the time of manufacture also makes the gum undesirable later when it is chewed. It would therefore be a benefit to be able to make chewing gum with erythritol that has increased stiffness to improve processability, especially a gum composition with a high level of erythritol and more than 2% moisture.

SUMMARY OF THE INVENTION

According to the present invention, there is provided a chewing gum composition which contains erythritol and a moisture binding agent. The moisture binding agent acts to tie up moisture present in the gum composition so that the softness imparted by the use of erythritol does not cause the gum to be too soft to wrap. In a first aspect, the invention is a chewing gum composition with increased stiffness to improve processability comprising gum base in an amount from about 5% to about 95% of the gum composition; erythritol in an amount from about 5% to about 95% of the gum composition; a moisture binding agent in an amount from about 0.5% to about 10% of the gum composition; and flavor in an amount from about 0.1% to about 10% of the gum composition.

In a second aspect, the invention is a method of making a chewing gum composition that has an increased stiffness to improve processability comprising the steps of providing gum base in an amount from about 5% to about 95% of the gum composition; providing erythritol in an amount from about 5% to about 95% of the gum composition; providing a moisture binding agent in an amount from about 0.5% to about 10% of the gum composition; providing flavor in an amount from about 0.1% to about 10% of the gum composition; and combining the gum base, erythritol, moisture binding agent and flavor to make the gum composition.

The preferred moisture binding agents include polydextrose, dextrins, maltodextrins, indigestible dextrins, gum arabic, fructooligosaccharides, oligofructose, natural gums, natural gum hydrolysates, gelatin, modified starches and cellulose derivatives. Preferably the moisture binding agents are used at a level of from about 0.5% to about 5% of the gum composition.

It has been found that gum compositions of the preferred embodiment of the invention containing erythritol and a moisture binding agent and having about 2% or more moisture have stiffness sufficient that the gum compositions have improved processability, particularly wrappability.

DETAILED DESCRIPTION OF THE INVENTION AND PREFERRED EMBODIMENTS

All percentages herein are weight percentages unless otherwise specified. The term "chewing gum" also includes bubble gum and the like.

The present chewing gum compositions contain erythritol, which has been discovered to be an excellent replacement for the sugar alcohol usually used in sugarless gums, especially those prepared with sorbitol as a sweetening/bulking agent.

PCT application Ser. No. PCT/US93/09354, filed Sep. 30, 1993, designating the United States, published as WO 95/08925, is hereby incorporated by reference.

Erythritol is a tetrahydric polyol or sugar alcohol, having the empirical formula $C_4H_{10}O_4$ and the structural formula $CH_2COH$—$CHOH$—$CHOH$—$CH_2OH$. It can be obtained by fermenting glucose with specially selected yeast strains in appropriate aqueous nutrient media, or by treating an aqueous alkali carbonate solution of 2-buten-1,4-diol with chlorine and saponifying the resulting chlorohydrin. Erythritol is available from Mitsubishi Kasei America, Inc., 81 Main Street, White Plains, N.Y. 10601; and from Mitsubishi Kasei Corp., outside the United States. Erythritol is also available from Cerestar S. A., Brussels, Belgium. As supplied by Mitsubishi, erythritol is a powder with a melting point of about 119° C. It has a sweetness level of about 75% of that of sucrose, and has good storage stability Its solubility in water at room temperature is 40%. Thus, erythritol may be used in a syrup form. Erythritol is not approved for use in human food products or chewing gum in the United States. However, Cerestar is currently seeking regulatory approval in the U.S. and Europe for the use of erythritol as a human food ingredient. Erythritol does not contribute to dental caries, does not cause gastric distress, and does not contribute significantly to caloric intake, giving a highly acceptable gum product.

Erythritol may be added to chewing gum in its solid or syrup form. Erythritol may be used in chewing gum as a texture and flavor modifier, bulking agent, and may improve texture, flavor and shelf life properties. Erythritol may replace solids like sucrose, dextrose, lactose, sorbitol or mannitol when used in its powder form, or may replace syrups when used in its liquid or syrup form. At levels of about 5% to about 25%, erythritol may replace part of the bulk sweeteners in sugar gum or, as a liquid, all or part of the syrup in sugar gum. At higher levels of about 25% to about 95% of the gum formulation, erythritol may replace all of the bulk sweeteners in a chewing gum formulation.

Unique chewing gum formulations can be obtained when all bulk sweeteners are replaced with erythritol powder and syrup. The relatively low sweetness intensity allows for use of unique flavor combinations, such as the use of savory and snack flavors. High-intensity sweeteners may be added to increase sweetness to obtain more typical chewing gum formulations. Chewing gum formulations with high levels of erythritol would be softer and less hygroscopic than sugar-containing gum formulations. Chewing gum formulations with erythritol may contain a very low amount of moisture in the gum formulation, i.e., below about 2%, or may contain a medium amount of moisture, about 2–5%, and may even be a soft gum formulation containing 5% moisture or more. The present invention is particularly suited to formulations that have about 2% or more moisture.

Although erythritol has properties like sucrose, and since it is a polyol, it may be used in chewing gum formulations containing non-sugar ingredients. Non-sugar ingredients are polyols such as sorbitol, mannitol, xylitol, hydrogenated isomaltulose, maltitol, lactitol and hydrogenated starch hydrolysate. These polyols are used in a variety of combinations to develop unique sugarless chewing gum formulations. Erythritol may be used to replace the individual polyols or combinations of polyols. With partial replacement of one or more polyols, erythritol can be used at levels of about 5% to about 25%. If erythritol replaces a large amount or most of the polyols, this level may be about 25% to about 95% of the gum formulation.

Some sugar-free chewing gum formulations contain high levels of glycerin and are very low in moisture, i.e., less than about 2%. Erythritol, solids or syrup, may replace part or all of the glycerin used in these types of formulations. At higher moisture levels (more than 2%) in sugar-free gum, a liquid solution of sorbitol (70% sorbitol, 30% water) is typically used. Erythritol solids or erythritol syrup may replace part or all of the sorbitol solution. Sugar-free syrups like hydrogenated starch hydrolysate (HSH), such as Lycasin brand HSH from Roquette, may also be replaced in part or totally by erythritol solids or syrup.

In some sugar-free gum formulations, HSH and glycerin are preblended and co-evaporated to reduce moisture. Erythritol solids and/or syrup may be used to replace part or all of the HSH/glycerin blends in such chewing gum formulations. Aqueous erythritol syrup may also replace HSH in the preblend with glycerin and be co-evaporated with glycerin to obtain a low moisture, non-crystallizable blend. Combinations of erythritol solids/syrup with polyols like sorbitol, maltitol, xylitol and mannitol in aqueous form may also be blended with glycerin and co-evaporated for use in low-moisture, sugar-free gum.

In a similar manner, erythritol solids/syrup preblended in glycerin and co-evaporated may be used in conventional sugar chewing gum formulations. Erythritol may be combined with sugars like dextrose, sucrose, lactose, maltose, invert sugar, fructose and corn syrup solids to form a liquid mix to be blended with glycerin and co-evaporated. Erythritol solids/syrup may also be mixed with conventional syrup and blended with glycerin and co-evaporated for use in a sugar chewing gum formulation.

Erythritol bulk sweetener may be co-dried with a variety of sugars such as sucrose, dextrose, lactose, fructose and corn syrup solids, and used in a sugar-containing gum formulation. Erythritol may also be co-dried with a variety of other polyols, such as sorbitol, mannitol xylitol, maltitol, hydrogenated isomaltulose, lactitol and hydrogenated starch hydrolysate, and used in a sugar-free gum formulation. Co-drying refers to methods of co-crystallization and co-precipitation of erythritol with sugars and other polyols, as well as co-drying by encapsulation, agglomeration and absorption with other sugars and polyols.

Co-drying by encapsulation, agglomeration and absorption can also include the use of encapsulating and agglomerating agents. Erythritol may be mixed with sugars or other polyols prior to being co-dried by encapsulation or agglomeration, or may be used alone with the encapsulating and agglomerating agents. These agents modify the physical properties of the bulk sweetener and control its release from chewing gum. Since erythritol is highly soluble in water as noted earlier, controlling the release of erythritol modifies the texture and flavor of the chewing gum.

Physical modifications of the bulk sweetener by encapsulation with another substrate will slow its release in chewing gum by reducing the solubility or dissolution rate. Any standard technique which gives partial or full encapsulation of the bulk sweetener can be used. These techniques include, but are not limited to, spray drying, spray chilling, fluid-bed coating and coacervation. These encapsulation techniques that give partial encapsulation or full encapsulation can be used individually or in any combination in a single step process or multiple step process. Generally, delayed release of erythritol is obtained in multistep processes like spray drying the bulk sweetener and then fluid-bed coating the resultant powder.

The encapsulation techniques here described are standard coating techniques and generally give varying degrees of coating from partial to full coating, depending on the coating composition used in the process. Also, the coating compositions may be susceptible to water permeation to various degrees. Generally, compositions that have high organic solubility, good film-forming properties and low water solubility give better delayed release of the bulk sweetener. Such compositions include acrylic polymers and copolymers, carboxyvinyl polymer, polyamides, polystyrene, polyvinyl acetate, polyvinyl acetate phthalate, polyvinyl pyrrolidone and waxes. Although all of these materials are possible for encapsulation of the bulk sweetener, only food-grade material should be considered. Two standard food-grade coating materials that are good film formers but not water-soluble are shellac and Zein. Others which are more water soluble, but good film formers, are materials like agar, alginates, a wide range of cellulose derivatives like ethyl cellulose, methyl cellulose, sodium hydroxymethyl cellulose and hydroxypropylmethyl cellulose, dextrin, gelatin, and modified starches. These ingredients, which are generally approved for food use, also give a delayed release when used as an encapsulant. Other encapsulants, like acacia or maltodextrin, can also encapsulate erythritol, but may increase the release rate of the bulk sweetener.

The amount of coating or encapsulating material on the bulk sweetener also controls the length of time for its release from chewing gum. Generally, the higher the level of coating, the slower the release of the bulk sweetener during mastication. The release rate is generally not instantaneous, but gradual over an extended period of time.

Another method of giving a delayed release of the bulk sweetener is agglomeration of the bulk sweetener with an agglomerating agent which partially coats the bulk sweeteners. This method includes the step of mixing the bulk sweetener and agglomerating agent with a small amount of water or solvent. The mixture is prepared in such a way as to have individual wet particles in contact with each other so that a partial coating can be applied. After the water or solvent is removed, the mixture is ground and used as a powdered, coated bulk sweetener.

Materials that can be used as the agglomerating agent are the same as those used in encapsulation mentioned previously. However, since the coating is only a partial encapsulation and the bulk sweetener is water soluble, some agglomerating agents are more effective in delaying the sweetener release than others. Some of the better agglomerating agents are the organic polymers like acrylic polymers and copolymers, polyvinyl acetate, polyvinyl pyrrolidone, waxes, shellac and Zein. Other agglomerating agents are not as effective in giving the bulk sweetener a delayed release as are the polymers, waxes, shellac and Zein, but can be used to give some delayed release. These other agglomerating agents include, but are not limited to, agar, alginates, a wide range of cellulose derivatives like ethyl cellulose, methyl cellulose, sodium hydroxymethyl cellulose and hydroxypropylmethyl cellulose, dextrin, gelatin, modified starches, and vegetable gums like guar gum, locust bean gum and carrageenin. Even though the agglomerated bulk sweetener is only partially coated, when the quantity of coating is increased compared to the quantity of the bulk sweetener, the release of the bulk sweetener can be delayed for a longer time during mastication.

The bulk sweetener may be coated in a two-step process or multiple-step process. The bulk sweetener may be encapsulated with any of the materials as described previously and then the encapsulated sweetener can be agglomerated as described previously to obtain an encapsulated/agglomerated/bulk sweetener product that could be used in chewing gum to give a delayed release of bulk sweetener.

Erythritol sweetener may be absorbed onto another component which is porous and becomes entrapped in the matrix of the porous component. Common materials used for absorbing the bulk sweetener include, but are not limited to, silicas, silicates, pharmasorb clay, sponge-like beads or microbeads, amorphous sugars like spray-dried dextrose, sucrose, polyols, amorphous carbonates and hydroxides, including aluminum and calcium lakes, vegetable gums and other spray dried materials.

Depending on the type of absorbent material and how it is prepared, the amount of bulk sweetener that can be loaded onto the absorbent will vary. Generally materials like polymers, sponge-like beads or microbeads, amorphous sugars and polyols and amorphous carbonates and hydroxides absorb about 10% to about 40% of the weight of the absorbent. Other materials like silica and pharmasorb clays may be able to absorb about 20% to about 80% of the weight of the absorbent.

The general procedure for absorbing the bulk sweetener onto the absorbent is as follows. An absorbent like fumed silica powder can be mixed in a powder blender and an aqueous solution of the bulk sweetener can be sprayed onto the powder as mixing continues. The aqueous solution can be about 30% to 40% solids, and higher solid levels may be used if temperatures up to 90° C. are used. Generally water is the solvent, but other solvents like alcohol could also be used if approved for use in food. As the powder mixes, the liquid is sprayed onto the powder. Spraying is stopped before the mix becomes damp. The still free-flowing powder is removed from the mixer and dried to remove the water or other solvent, and ground to a specific particle size.

After the bulk sweetener is absorbed onto an absorbent or fixed onto an absorbent, the fixative/sweetener can be coated by encapsulation. Either full or partial encapsulation may be used, depending on the coating composition used in the process. Full encapsulation may be obtained by coating with a polymer as in spray drying, spray chilling, fluid-bed coating, coacervation, or any other standard technique. A partial encapsulation or coating can be obtained by agglomeration of the fixative/sweetener mixture using any of the materials discussed above.

Where the encapsulating or agglomerating agent is also a moisture binding agent, it is expected that the encapsulating or agglomerating agent will fulfill the role of absorbing moisture to improve the stiffness of the gum. In that case, the moisture binding agent is coated onto or agglomerated with the erythritol prior to being mixed into the gum.

Erythritol may be used with other bulk sweeteners and in combinations that give unique properties. Erythritol may be co-dried by various delayed release methods noted above with other bulk sweeteners like isomaltulose, sucrose, dextrose, lactose, maltose, fructose, corn syrup solids, sorbitol, mannitol, xylitol, maltitol, hydrogenated isomaltulose, lactitol and hydrogenated starch hydrolysate for use in sugar and sugar-free chewing gum.

In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% by weight of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5% to about 95% of the gum. More preferably the insoluble gum base comprises between 10% and 50% of the gum and most preferably about 20% to about 40% of the gum. The present invention contemplates employing any commercially acceptable gum base.

The water-soluble portion of the chewing gum may further comprise softeners, sweeteners, flavoring agents and combinations thereof. The sweeteners often fulfill the role of bulking agents in the gum. The bulking agents typically comprise about 5% to about 95% of the gum composition. In the present invention, erythritol will be used for all or part of the sweetener/bulking agent. The erythritol will comprise from about 5% to about 95%, preferably from about 10% to about 70%, and most preferable from about 30% to about 60% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolysate, corn syrup and combinations thereof may be used as softeners and binding agents in gum.

As mentioned above, the erythritol bulk sweetener of the present invention may be used in sugar gum formulations. However, sugar-free formulations are also within the scope of the invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination.

The erythritol sweetener of the present invention can also be used in combination with other sugarless sweeteners. Generally sugarless sweeteners include components with sweetening characteristics but which are devoid of the commonly known sugars and comprise, but are not limited to, sugar alcohols such as sorbitol, mannitol, xylitol, hydrogenated starch hydrolysate, maltitol and the like, alone or in any combination. Preferably the gum compositions will include from about 5% to about 50% sorbitol. The sorbitol may be provided partly in its liquid solution form.

Depending on the particular sweetness release profile and shelf-stability needed, the erythritol solid bulk sweetener of the present invention can also be used in combination with coated or uncoated high-intensity sweeteners or with high-intensity sweeteners coated with various materials and by various techniques. High intensity sweeteners, preferably aspartame, may be used at levels from about 0.01% to about 3%.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, preferably from about 0.5% to about 3.0%, of the gum.

Optional ingredients such as colors, emulsifiers and pharmaceutical agents may also be added as separate components of the chewing gum composition, if not added as part of the gum base.

Mannitol can be added directly to the mix, or used as a rolling compound, i.e., a non-hygroscopic material added in powdered form to the surface of sticks of gum to prevent the sticks of gum from sticking to machinery, wrapping papers, and the like.

Other conventional gum ingredients may also be included. Encapsulated aspartame is a high intensity sweetener with improved stability and release characteristics, as compared to free aspartame. Free aspartame can also be added, and a combination of some free and encapsulated aspartame is often preferred when aspartame is added.

Aqueous syrups, such as corn syrup and hydrogenated corn syrup may be used. Such aqueous syrups may be coevaporated with a plasticizer, such as glycerin or propylene glycol, to a moisture content of less than 10%. Such syrups and their methods of preparation are discussed in detail in U.S. Pat. No. 4,671,967, incorporated herein by reference.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form, such as by rolling into sheets and cutting into sticks, extruding into chunks or casting into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of erythritol and other bulking agents may be added to the mixer. Flavor is typically added with the final portion of the bulking agent. Other optional ingredients are added in the batch in a typical fashion, well known to those of ordinary skill in the art. It is conventional to cool the gum prior to wrapping, so as to make the gum more manageable.

By adding moisture binding agents to the gum, water in the gum becomes trapped and the texture of the gum becomes tougher and easier to process. There are several moisture binding agents that could be used to entrap the water in gum. Such moisture binding agents include polydextrose, dextrins, maltodextrins, indigestible dextrins, gum arabic, fructooligosaccharides, oligofructose, natural gums, natural gum hydrolysates, gelatin, modified starches and cellulose derivatives. Water binders such as hydroxypropylmethyl cellulose, gum arabic, gelatin, maltodextrin, carboxymethyl cellulose and polydextrose are preferred.

EXAMPLES

Chewing gum, made with a sorbitol solution containing 70% sorbitol and 30% water, was made with various types of moisture binding agents at different percentages on lab scale production equipment. Comparative formulations were prepared without any moisture binding agents. Taber flexibility studies were run on these samples to determine their texture. The Example and Comparative Example formulations and the Taber stiffness results are shown in Tables I and Table II.

TABLE I

|  | Comp. Ex. A | Comp. Ex. B | Comp. Ex. C | Ex. 1 | Ex. 2 | Ex. 3 |
| --- | --- | --- | --- | --- | --- | --- |
| Erythritol | 60.0 | 50.0 | 40.0 | 59.5 | 49.5 | 39.5 |
| Gum Base | 30.0 | 30.0 | 30.0 | 30.0 | 30.0 | 30.0 |
| Sorbitol Solution | 6.0 | 6.0 | 6.0 | 6.0 | 6.0 | 6.0 |
| Mannitol | 3.0 | 3.0 | 3.0 | 3.0 | 3.0 | 3.0 |
| Sorbitol | — | 10.0 | 20.0 | — | 10.0 | 20.0 |
| Flavor | 1.0 | 1.0 | 1.0 | 1.0 | 1.0 | 1.0 |
| HPMC | — | — | — | 0.5 | — | — |
| Gum Arabic | — | — | — | — | 0.5 | — |
| Maltodextrin | — | — | — | — | — | 0.5 |
| Taber Stiffness | 28.1 | 37.6 | 48.8 | 24.3 | 42.9 | 54.5 |

TABLE II

|  | Comp. Ex. D | Comp. Ex. E | Comp. Ex. F | Ex. 4 | Ex. 5 | Ex. 6 |
| --- | --- | --- | --- | --- | --- | --- |
| Erythritol | 11.0 | 21.0 | 31.0 | 10.0 | 20.0 | 30.0 |
| Gum Base | 30.0 | 30.0 | 30.0 | 30.0 | 30.0 | 30.0 |
| Sorbitol Solution | 9.0 | 9.0 | 9.0 | 9.0 | 9.0 | 9.0 |
| Mannitol | 3.0 | 3.0 | 3.0 | 3.0 | 3.0 | 3.0 |
| Sorbitol | 44.0 | 34.0 | 24.0 | 44.0 | 34.0 | 24.0 |
| Flavor | 1.0 | 1.0 | 1.0 | 1.0 | 1.0 | 1.0 |
| Glycerin | 2.0 | 2.0 | 2.0 | 2.0 | 2.0 | 2.0 |
| CMC | — | — | — | 1.0 | — | — |
| Gelatin | — | — | — | — | 1.0 | — |
| Polydextrose | — | — | — | — | — | 1.0 |
| Taber Stiffness | 48.3 | 45.5 | 34.2 | 55.1 | 44.1 | 35.3 |

The Taber stiffness measured in the Taber flexibility study indicates how soft the gum is. Low Taber stiffness scores denote high flexibility and less stiffness, while higher Taber stiffness scores denote higher gum stiffness. Gum produced on lab scale production equipment will often have a greater Taber stiffness than gum with the same formulation made on production scale equipment.

As seen from the results in the Tables, the binders that were most effective in creating a tougher gum were gum arabic in Example 2, maltodextrin in Example 3, carboxymethyl cellulose in Example 4 and polydextrose in Example 6. The hydroxypropylmethyl cellulose and gelatin in Examples 1 and 5 respectively would preferably be used at a higher level to provide greater stiffness.

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, indicated by the appended claims rather than by the foregoing description. All changes which come within the meaning and range of equivalency of the claims are to be embraced within their scope.

We claim:

1. A chewing gum composition with increased stiffness to improve processability comprising:
    a) gum base in an amount from about 5% to about 95% of the gum composition;
    b) erythritol in an amount from about 10% to about 70% of the gum composition;
    c) a moisture binding agent selected from the group consisting of carboxymethyl cellulose, gum arabic, maltodextrins and polydextrose in an amount from about 0.5% to about 10% of the gum composition; and
    d) flavor in an amount from about 0.1% to about 10% of the gum composition.

2. The chewing gum composition of claim 1 containing about 2% or more water.

3. The chewing gum composition of claim 1 wherein the erythritol comprises from about 30% to about 60% of the gum composition.

4. The chewing gum composition of claim 1 further comprising sorbitol in an amount from about 5% to about 50% of the gum composition.

5. The chewing gum composition of claim 1 being substantially free of sugars.

6. The chewing gum composition of claim 1 wherein the gum base is present in an amount of from about 10% to about 50% of the gum composition and the gum contains more than 2% moisture.

7. A method of making a chewing gum composition that has an increased stiffness to improve processability comprising the steps of:
    a) providing gum base in an amount from about 5% to about 95% of the gum composition;
    b) providing erythritol in an amount from about 10% to about 70% of the gum composition;
    c) providing a moisture binding agent selected from the group consisting of carboxymethyl cellulose, gum arabic, maltodextrins and polydextrose in an amount from about 0.5% to about 10% of the gum composition;
    d) providing flavor in an amount from about 0.1% to about 10% of the gum composition; and
    e) combining the gum base, erythritol, moisture binding agent and flavor to make the gum composition.

8. The method of claim 7 wherein the composition when combined contains about 2% or more water.

9. The method of claim 7 further comprising the step of providing sorbitol in an amount from about 5% to about 50% of the gum composition and combining the sorbitol with the gum base, erythritol, moisture binding agent and flavor while making the gum composition.

10. The method of claim 9 wherein the sorbitol is provided at least partly in syrup form.

11. The method of claim 7 wherein the erythritol comprises from about 30% to about 60% of the gum composition.

12. The method of claim 8 wherein the moisture binding agent is coated onto or agglomerated with the erythritol prior to mixing the erythritol and moisture binding agent with the gum base.

13. A chewing gum composition comprising:
   a) gum base in an amount of from about 20% to about 40% of the gum composition;
   b) erythritol in an amount from about 30% to about 60% of the gum composition;
   c) a flavoring in an amount from about 0.5% to about 3% of the gum composition;
   d) water in an amount from about 2% to about 5% of the gum composition; and
   e) a moisture binding agent selected from the group consisting of carboxymethyl cellulose, gum arabic, maltodextrins and polydextrose in an amount from about 0.5% to about 5% of the gum composition.

\* \* \* \* \*

UNITED STATES PATENT AND TRADEMARK OFFICE
CERTIFICATE OF CORRECTION

PATENT NO.     : 5,916,606
DATED          : June 29, 1999
INVENTOR(S)    : David W. Record et al.

It is certified that error appears in the above-identified patent and that said Letters Patent is hereby corrected as shown below:

<u>Column 11,</u>
Line 6, delete "claim 8" and substitute -- claim 7 -- in its place.

Signed and Sealed this

Eighteenth Day of November, 2003

JAMES E. ROGAN
*Director of the United States Patent and Trademark Office*